US012144691B2

(12) United States Patent
Silvonen et al.

(10) Patent No.: US 12,144,691 B2
(45) Date of Patent: Nov. 19, 2024

(54) DENTAL CARE UNIT, CONTROL OF THE DENTAL CARE UNIT AND DENTAL CARE ROOM

(71) Applicant: Planmeca Oy, Helsinki (FI)

(72) Inventors: Timo Silvonen, Espoo (FI); Christian De Godzinsky, Vantaa (FI); Marko Vuorinen, Espoo (FI)

(73) Assignee: Planmeca Oy, Helsinki (FI)

( * ) Notice: Subject to any disclaimer, the term of this patent is extended or adjusted under 35 U.S.C. 154(b) by 776 days.

(21) Appl. No.: 17/292,251

(22) PCT Filed: Nov. 18, 2019

(86) PCT No.: PCT/FI2019/050824
§ 371 (c)(1),
(2) Date: May 7, 2021

(87) PCT Pub. No.: WO2020/099727
PCT Pub. Date: May 22, 2020

(65) Prior Publication Data
US 2021/0401539 A1 Dec. 30, 2021

(30) Foreign Application Priority Data
Nov. 16, 2018 (FI) .................................. 20180130

(51) Int. Cl.
*A61C 1/00* (2006.01)
*A61C 1/08* (2006.01)
(Continued)

(52) U.S. Cl.
CPC ............ *A61C 1/0007* (2013.01); *A61C 1/088* (2013.01); *A61C 19/00* (2013.01); *A61G 15/14* (2013.01)

(58) Field of Classification Search
CPC ......... A61C 1/0007; A61C 1/088; A61C 1/08; A61C 19/00
(Continued)

(56) References Cited

U.S. PATENT DOCUMENTS 4,013,328 A * 3/1977 Wolf .................. F16M 11/2021
433/79
4,445,859 A 5/1984 Hoffmeister et al.
(Continued)

FOREIGN PATENT DOCUMENTS

GB 919276 A 2/1963
JP 2001-514053 A 9/2001
(Continued)

OTHER PUBLICATIONS

Written Opinion and International Search Report dated Mar. 4, 2020, issued in International Application No. PCT/FI2019/050824 (11 pages).

*Primary Examiner* — Ralph A Lewis
*Assistant Examiner* — Mirayda A Aponte
(74) *Attorney, Agent, or Firm* — Potomac Law Group, PLLC; Douglas E. Ringel

(57) ABSTRACT

Structures of a dental care unit used in dental care work are disclosed. A frame part of the dental care unit has one or more components to attach a vertically extending support part, and a cover structure of the frame part has at least a first and a second cover part. The support part extends vertically essentially from an area of a seam locus between the cover parts, whereto is arranged a seam element. The seam element is preferably arranged to emit light as controlled by a control system of the dental care unit. A dental care unit like this is specifically applicable for use in a dental care room or premises having several dental care units.

23 Claims, 7 Drawing Sheets

(51) Int. Cl.
*A61C 19/00* (2006.01)
*A61G 15/14* (2006.01)

(58) Field of Classification Search
USPC .......................................................... 433/98
See application file for complete search history.

(56) References Cited

U.S. PATENT DOCUMENTS

| | | |
|---|---|---|
| 5,211,558 A | 5/1993 | Bailey et al. |
| 5,655,905 A | 8/1997 | Jaimes et al. |
| 10,058,297 B2 | 8/2018 | Park et al. |
| 2006/0046226 A1* | 3/2006 | Bergler ................. A61G 15/16 433/29 |
| 2010/0129770 A1 | 5/2010 | Benfield et al. |
| 2017/0128177 A1 | 5/2017 | Chung |

FOREIGN PATENT DOCUMENTS

| | | |
|---|---|---|
| JP | 2002165818 A | 6/2002 |
| JP | 2006122383 A | 5/2006 |
| JP | 2008226577 A | 9/2008 |
| KR | 2008-0090182 A | 10/2008 |
| KR | 10-1492101 B1 | 2/2015 |
| KR | 2017-0015954 A | 2/2017 |
| WO | 1999/011307 A1 | 3/1999 |
| WO | 2015/147490 A1 | 10/2015 |

* cited by examiner prior art

DENTAL CARE UNIT, CONTROL OF THE DENTAL CARE UNIT AND DENTAL CARE ROOM

CROSS REFERENCE TO RELATED APPLICATIONS

This application is a national phase of International Application No. PCT/FI2019/050824, filed Nov. 18, 2019, which claims priority to Finnish Application No. 20180130, filed Nov. 16, 2018.

FIELD OF INVENTION

The invention relates to structures of a dental care unit used in dental care work, in various embodiments of the invention particularly to solutions used in the cover structure of the dental care unit and in structures under the cover structure. The invention also relates to controlling dental care units and to a dental care room or premises comprising dental care units according to the invention.

BACKGROUND OF THE INVENTION

In the field of odontology, the term dental care unit (often also just 'dental unit') refers to an apparatus or arrangement which supplies power and also possibly control signals to instruments used in connection with dental care operations, and also possibly to various other devices used in connection with dental care operations.

One typical solution used in dental care units is to arrange dental care instruments on an instrument console which is supported by a support arm extending from the frame structure of the dental care unit. The dental care unit may comprise more than one and also different support arms, for example for dental assistant's instruments or for other devices used in connection with dental care operations.

One typical solution used in dental care units is to arrange one or more horizontal support arms to a support arrangement which extends vertically from the frame part of the dental care unit. Such an arrangement is typically implemented either to comprise a certain number of support arms or to enable a certain number of different arm assembly variations, which can be implemented either when originally assembling the dental care unit or later as a retrofit. Such vertical support arrangement is typically connected to the cover structures of the frame part of the dental care unit.

As individual dentists and on the other hand different dental clinics, educational establishments and also dentists in different cultures have needs and wishes differing from each other relating to equipping a dental care unit with instruments, accessories and support arm solutions according to one's convenience, it is a challenge for a manufacturer of dental care units to design and keep on offering different dental care unit versions.

BRIEF DESCRIPTION OF THE INVENTION

The object of the invention is to provide a dental care unit whose frame structure is realized such that a vertically extending support structure often used in dental care units is reasonably simple to attach or retrofit to the frame structure (or to remove from it) in the field. The object of some preferred embodiments of the invention is to realize the frame structure such that one at the same time provides novel functionality to the dental care unit.

The characteristic features of the invention are defined in the accompanying independent claims. Essentially in the dental care unit according to the invention, its cover structure is realized as comprising at least two parts and preferably such that removing a cover part removably connected to the cover structure provides access to structures under the cover structure, while the possibility to open the cover structure also facilitates mounting of and changing to another a pole extending vertically through the cover structure.

BRIEF DESCRIPTION OF FIGURES

In the attached figures

DETAILED DESCRIPTION OF THE FIGURES

Figure 1:
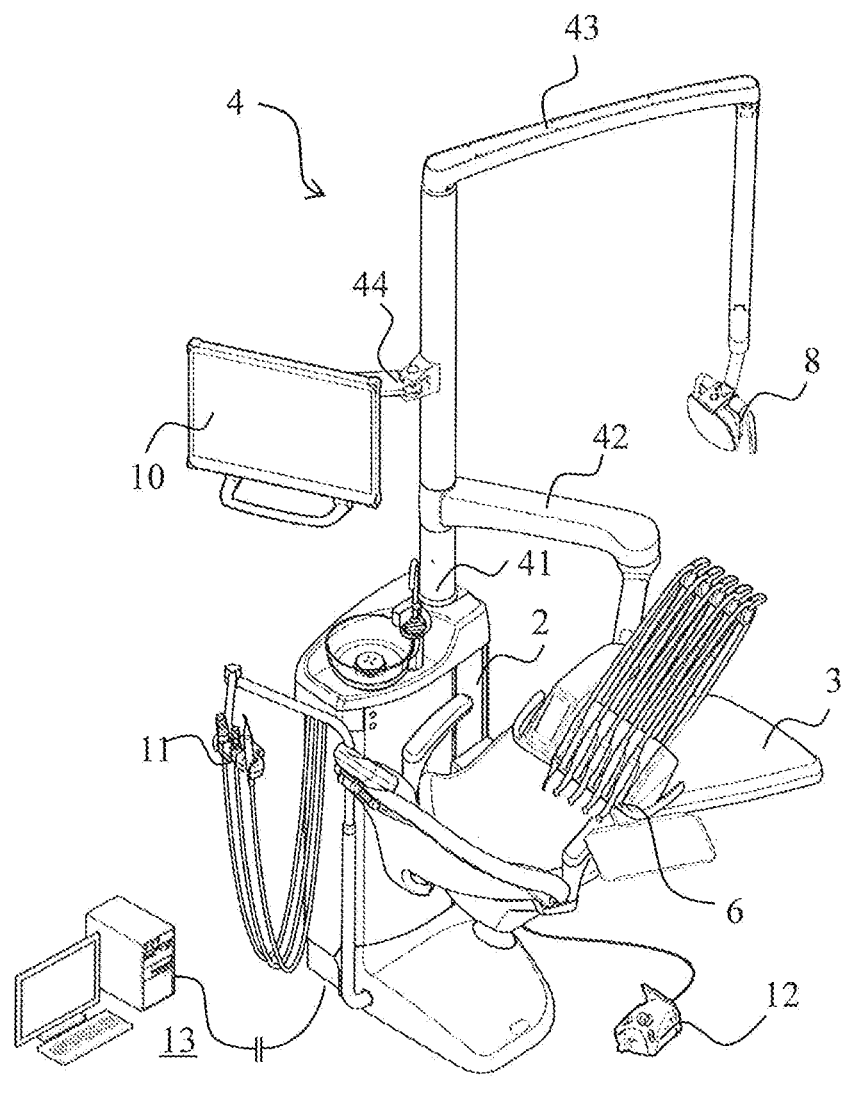
FIG. 1 shows one typical dental care unit according to the prior art.

FIG. 1 shows a basic structure of one typical dental care unit 1 intended for use in connection with dental care work. The dental care unit 1 of FIG. 1 comprises a frame part 2 and a patient chair 3 connected to it. From the frame part 2 extends vertically a support arrangement 4 which comprises a vertically extending support part 41, a first support structure 42 to support diagnostic instruments related to dental care or instruments 6 used in connection with dental care operations, or both, a second support structure 43 for e.g. an operating light 8 or for an X-ray imaging means used in connection with dental care operations, and a third support structure 44 for e.g. a display 10.

FIG. 1 further shows an instrument holder 11, which can be configured to support instruments typically used by the dental assistant, and a foot control 12 by which functions of the dental care unit 1 and/or devices or structures connecting or coupled to it can be controlled. Additionally, the dental care unit 1 is arranged into operational connection with a data network or an individual computer 13.

It should be noted that the dental care unit of FIG. 1 is only one example. Within the scope of the invention, the dental care unit can comprise e.g. more support structures or fewer support structures for different devices than included in the structure of FIG. 1. Also, for example the patient chair does not necessarily need to be integrated with the dental care unit but it can be realized as a structure completely separate from the dental care unit. On the other hand, the frame structure can be arranged as an integral part of structures of a floor-mounted chair. Furthermore, instead of a structure having considerable horizontal and vertical dimensions as shown in FIG. 1, the frame structure of the dental care unit can be as for its dimensions principally only a minor structure from which extend one or more than one support arm. Along with or in addition to a foot control, the arrangement can also include a graphical or other user interface. The structure of the dental care unit according to the invention is however realized such that via it are delivered or can be arranged to be delivered power, fluid and/or control signals needed for using the instruments and devices used in the dental care operations. Thus, physically this means delivering for example at least one of the following: water, compressed air, electricity, control signal.

Thus, in the context of this application, when mentioning a dental care unit it refers to a structure which includes an arrangement which enables supplying at least one of the above-mentioned or a corresponding variable to dental care instruments and/or a device used in connection with dental care work operations which are arranged in connection with the dental care unit.

The dental care unit of FIG. 1 is thus one example of a typical dental care unit according to prior art. The frame structure of the dental care unit of FIG. 1 comprises a single-piece cover part which entirely, or in practice entirely covers the frame structure of the dental care unit.

FIGS. 2 to 6 show a gathering of solutions according to different embodiments of the invention for use in connection with the cover structure of the frame part of the dental care unit and, on the other hand, in structures underneath the cover structure.

Figure 2:
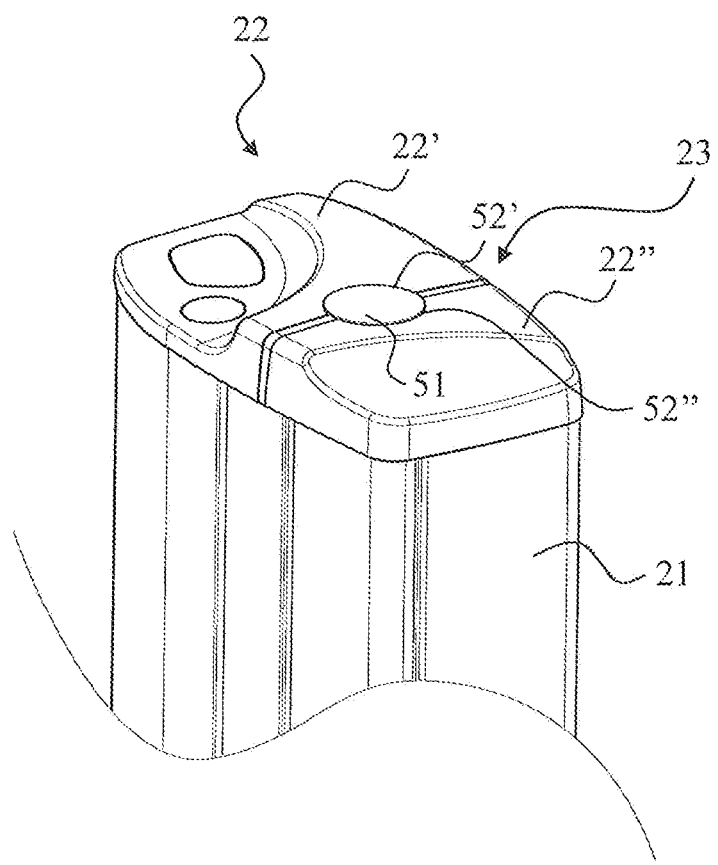
FIG. 2 shows a cover structure of a frame structure of a dental care unit which can be applied, as an example, in connection with a dental care unit according to FIG. 1.
Figure 3:
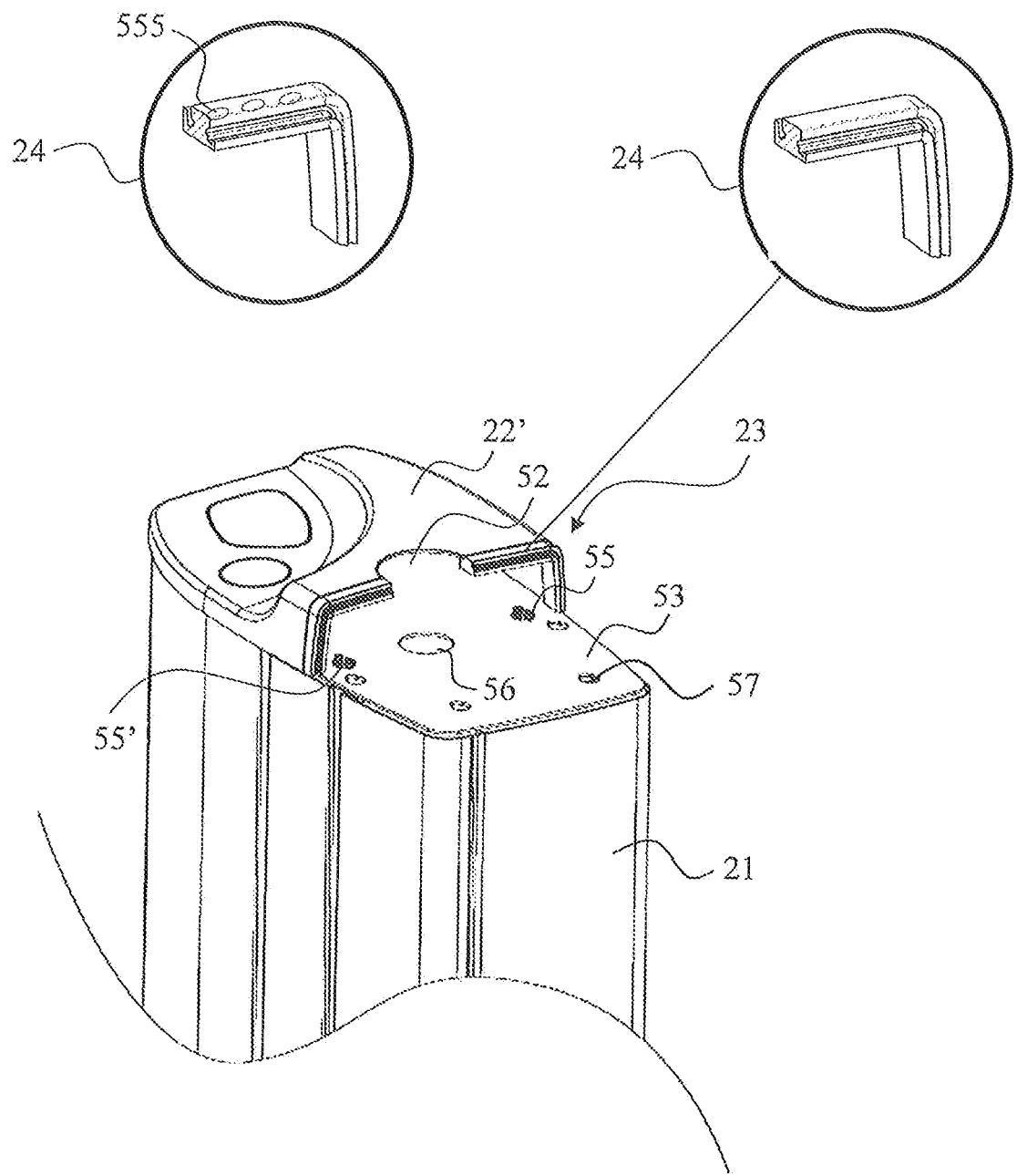
FIG. 3 shows the solution of FIG. 2 with another of the cover parts of the cover structure removed.

FIGS. 2 and 3 show one example of a cover structure 22 of the dental care unit according to the invention. The cover structure 22 is formed by a first cover part 22' and a second cover part 22' with a seam locus 23 being formed between them, which cover parts 22', 22" together cover the vertically extending wall structure 21 of the frame part 2. An opening 52 is arranged to be formed between the first cover part 22' and the second cover part 22" which in the embodiment of FIGS. 2 and 3 is substantially circular opening 52 and formed by semi-circular adjoining notches 52', 52" provided in the first and the second cover parts 22', 22". In FIG. 2 the opening 52 in the cover structure 22 is closed with a closing disc 51. Such closing disc 51 can be arranged to close the opening 52 in an embodiment in which a vertically extending support part 41, as shown in FIG. 1, has not been adapted to extend through the cover structure 22 but the frame part 2 has only been provided with a means for mounting a vertically extending support part 41 at a later stage.

The cover structure 22 is according to the invention arranged to comprise at least the first and the second cover parts 22', 22", of which in the embodiment of FIGS. 2 and 3 the second cover part 22" is arranged to be removably attached without having to disassemble the entire cover structure 22. This solution provides a practical possibility to realize the frame part 2 of a dental care unit such that at least some of the structures and components located within the frame part 2 are easily accessible from above. Naturally, such part of a cover structure is respectively smaller and lighter and thus easier to handle than the entire cover structure 22 as a whole would be.

Realizing the cover structure 22 in more than one cover part 22', 22" provides, especially, a possibility to facilitate attaching the support structure 4 comprising the vertically extending support part 41 to the frame structure 2 of the dental care unit. Thanks to the invention, the attaching arrangement of the support structure 4 can be realized such that, when needed, the support structure 4 is also later relatively easy to be changed to another or to be retrofit to a dental care unit.

In FIG. 3, structures of the frame part 2 of the dental care unit are shown with the second cover part 22" removed, on the one hand to show a more detailed view of the sealing element 24 which is arranged in the seam locus 23, and on the other hand to show the support plate 53 which is located under the cover structure 22 and at a vertical distance below the cover structure 22, and structures arranged on it. These structures comprise in the embodiment of FIG. 3 guiding holes 57 (in FIGS. 3 to 5, for clarity of the Figs, only one of these holes is referred to in each case). In the guiding holes 57 can for example be arranged, as removably attached, attaching pins (not shown in Figures) integrated into the second cover part 22" and orienting vertically downwards, for enabling removable attaching of the second cover part 22" to the frame part 2.

FIG. 3 shows further a light arrangement comprising two lights 55, 55'. The light 55, 55' can comprise as a light source for example an RGB LED component by means of which light can be emitted in different colours.

FIG. 3 shows also a passage 56 arranged to the support plate 53, for not only the vertically extending support part 41 but also for the cabelings to be led through the support plate 53 or that support part 41. (For keeping the figures of the application clearer they do not show tubes or cables for which passages 56 are arranged to the frame part 2.)

The light arrangement can, instead of or in addition to lights 55, 55' arranged under the cover structure 22, comprise one or more than one light emitting component 555 integrated to the sealing element 24 (FIG. 3 shows another embodiment of the sealing element 24).

In general, the number, structure and operating principle of components of a light arrangement 55, 55' arranged under the cover structure 22 or of light emitting components 555 integrated into the sealing element 24 can vary within the scope of the invention. In some embodiments of the invention it is, however, preferred that the light arrangement 55, 55' and/or the one or more than one light emitting component 555 integrated into the sealing element 24 can be controlled via the control system of the dental care unit to produce for example light in at least two different colours and/or light which is pulsed in different ways. In such context, "pulsed in different ways" covers as one embodiment a pulse which in practice means producing light continuously.

In the embodiment of FIGS. 2 and 3, two separate sealing elements 24 arranged in the seam locus 23 and extending towards the outer peripheries of the cover structure 22 are arranged as for their part to limit the opening 52 provided for the vertical support part 41.

On the other hand, the sealing element 24 can in one embodiment of the invention be arranged to extend as a single and continuous element across the entire cover structure 22 such that it branches into two at the opening 52 in the cover structure 22. In this embodiment, the sealing element 24 can thus close around the vertical support part 41 which is positioned in the opening 52.

The shape of the contours of the notches 52', 52" of the cover parts arranged in the seam locus 23 between the first and the second cover parts 22', 22", can in other embodiments of the invention also be other than the semi-circle shown in FIGS. 2 and 3.

In an extreme case the edges of the cover parts 22', 22" in the seam locus 23 can even be linear over their entire length. In that case the dimensions of the support part 41, which extends vertically from the cover structure 22, in relation to the width of the seam locus 23 formed between the cover parts 22', 22" and of the sealing element 24 arranged in the seam locus 23, are naturally to be realized such that the vertically extending support part 41 fits into the seam locus 23 between the first and the second cover parts 22', 22".

One preferred embodiment of the cover structure 22 can be thought to be formed of a structure in which at least one of the at least first and second cover parts 22', 22" that belong to the cover structure 22 is provided with a cut-out or an opening 52 for receiving the vertically extending support part 41 which connects with the area of the at least one seam locus 23 or with the seam locus 23 itself.

Said cut-out or opening 52 can be arranged to be formed by notches 52', 52" which are provided in both the first and the second cover parts 22', 22" and adjoining the seam locus 23.

The vertically extending support part 41, which is attached to the dental care unit, can be adapted to extend through the opening 52 which is provided in the cover structure 22 in some of the above-described ways.

In the embodiments shown in the accompanying figures, the sealing element 24 is realized in two parts and such that it does not extend to entirely surround the vertically extending support part 41. One solution is to realize the sealing element 24 described in connection with the above-mentioned embodiments by cutting it, at the location of the substantially vertically extending support part 41, into two parts. This creates a structure which, while the sealing element 24 surrounds the vertically extending support part 41, considering installing the support structure 4 makes putting the structure together easier. Such a cut can alternatively be provided to the sealing element 24 only on one side of the location whereto the vertically extending support part 41 gets positioned.

In one preferred embodiment of the invention the cover structure 22 comprises in at least one area of the seam locus 23 a form which is sloping downwards towards the outer periphery of the cover structure 22.

In one preferred embodiment of the invention the periphery of the cover structure 22 extends in the at least one seam locus 23 horizontally beyond the vertically extending wall structure 21 of the frame part 2.

In one preferred embodiment of the invention the cover structure 22 comprises in the at least one seam locus 23 on its outer periphery a portion extending substantially vertically downwards.

In one preferred embodiment of the invention the cover structure 22 thus comprises in the seam locus 23 a substantially horizontally extending surface, such as a surface sloping slightly downwards towards the outer periphery of the cover structure 22.

FIGS. 2 and 3 show how the surface of the cover structure 22 can at its outer periphery be bent to turn downwards and to extend a distance over the vertically extending wall structure 21 of the frame part 2. In this case also the sealing element 24 can be arranged to bend correspondingly and to extend beyond the bending point of the cover structure 22.

In one preferred embodiment of the invention the cover structure 22 is divided into cover parts 22', 22" such that the seam locus 23 between the cover parts 22', 22" extends across the substantially horizontal surface of the cover structure 22 to the mentioned vertical surfaces. In this case the cover structure 22 can comprise a seam locus 23 formed of one or more than one sealing element 24, wherein for example an arrangement described more in detail in the following enables a light emitting seam locus 23 which extends across the substantially horizontal surface of the cover structure 22 and onto its opposite sides.

In the embodiment of FIGS. 2 and 3 the sealing arranged in the seam locus 23 is formed by two separate sealing elements 24, of which both extend from the opening 52 between the cover parts 22', 22" onto the outer periphery of the cover parts 22', 22".

In one embodiment of the invention the sealing element 24 extends in the at least one seam locus 23 towards the outer periphery of the cover structure 22 as far as the cover structure 22 does.

In the embodiment of the invention of FIGS. 2 and 3 across the cover structure 22 extends one seam locus 23 and in connection therewith is fitted an arrangement consisting of two sealing elements 24, but the seam locus 23 can, however, also be arranged in the cover structure 22 in another manner. There may be more than one seam locus 23, wherein for example the second cover part 22" according to the accompanying figures can still be divided into two cover parts such that the seam locus formed between them extends onto the periphery of the cover structure 22 substantially perpendicularly from the seam locus 23 between the first and the second cover parts 22', 22".

Figure 4:
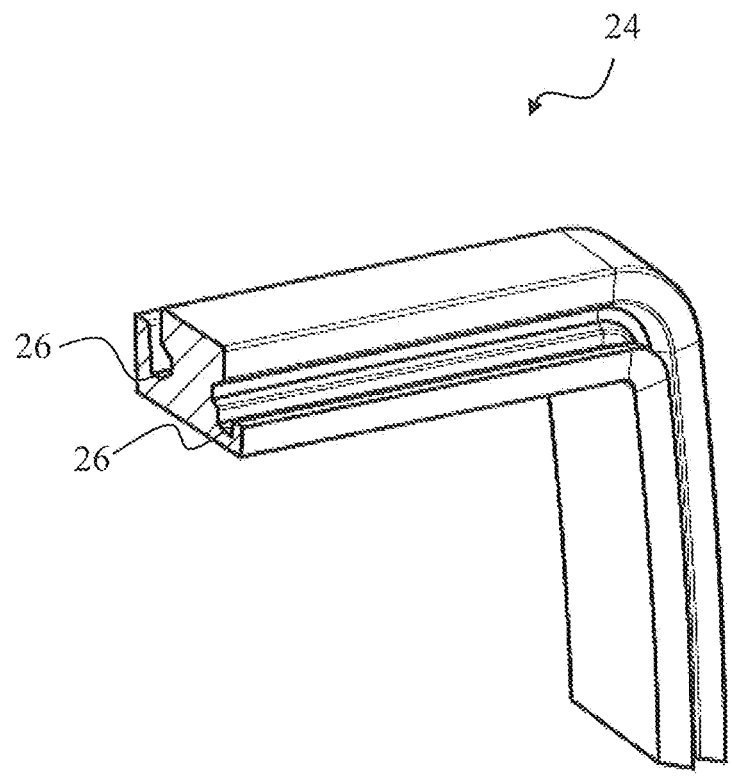
FIG. 4 shows a sealing element applicable for use in a seam locus between cover parts of a cover structure.

FIG. 4 shows one preferred embodiment of the structure of the sealing element 24. The sealing element 24 of FIG. 4 comprises two leakage grooves 26 which are adapted to collect liquid possibly dripping at the seam locus 23 of the cover parts 22', 22". The number of the leakage grooves 26 can also be other than two. The leakage groove 26 is intended for protecting the structures and components under the cover structure 22 from getting wet and dirty.

When the forms of the cover structure 22 are realized as above described, sloping downwards towards the outer periphery, the liquid possibly gotten into the leakage groove 26 can flow gravitationally in the leakage groove 26 first to the edge of the cover structure 22 and further outside the vertically extending cover structure 21 of the frame part 2 of the dental care unit.

The profile of the sealing element 24 does not necessarily have to be same along its entire length, such as entirely according to FIG. 4. For example, if a solution consisting of two sealing elements 24 as shown in FIG. 3 is used, which sealing elements 24 are connecting at their first ends to the opening 52 provided in the cover structure 22 or to the vertical support part 41 located in the opening 52, the ends of the sealing elements 24 can be closed at those first ends such that none of the leakage grooves 26 arranged in the sealing element 24 extend all the way to the opening 52. In this case each one or more than one leakage groove 26 extends in an open fashion particularly in the direction of the outer periphery of the cover structure 22, preferably beyond the vertical wall 21 of the frame part 2 as according to one of the above-described embodiments.

The cross-sectional profile of the sealing element 24 can thus comprise at least one leakage groove 26 on at least part of the length of the sealing element 24.

In one preferred embodiment of the invention the sealing element 24 or the sealing elements can be made of an elastic material and to imitate the form of the cover parts 22', 22" at the seam locus 23, but the sealing element 24 can also be an elastic sealing strip which, when assembling the cover structure 22, positions according to the forms of the seam locus 23 between the cover parts 22', 22".

Figure 5:
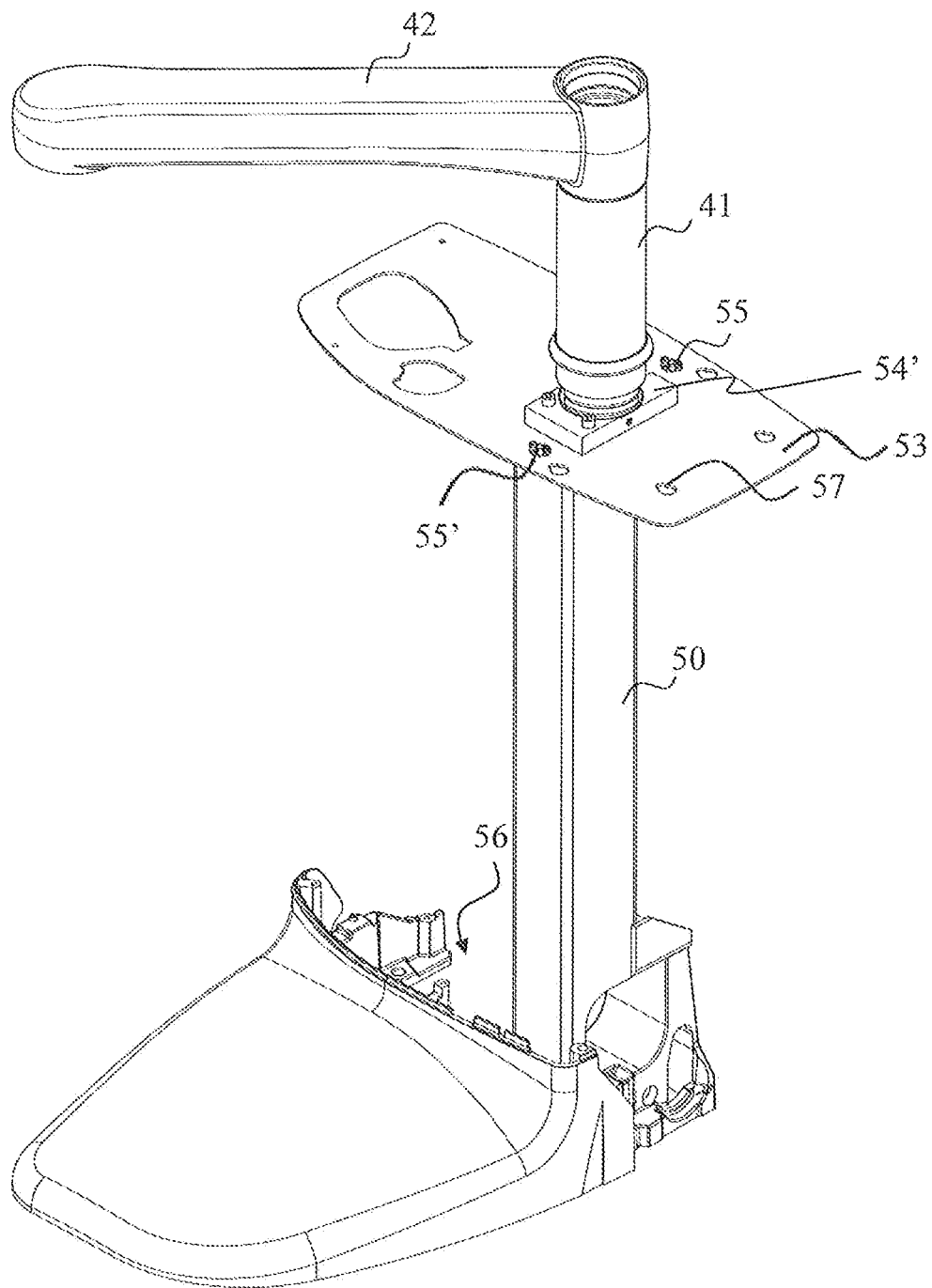
FIG. 5 shows inner structures of the frame part of a dental care unit according to FIG. 2.
Figure 6:
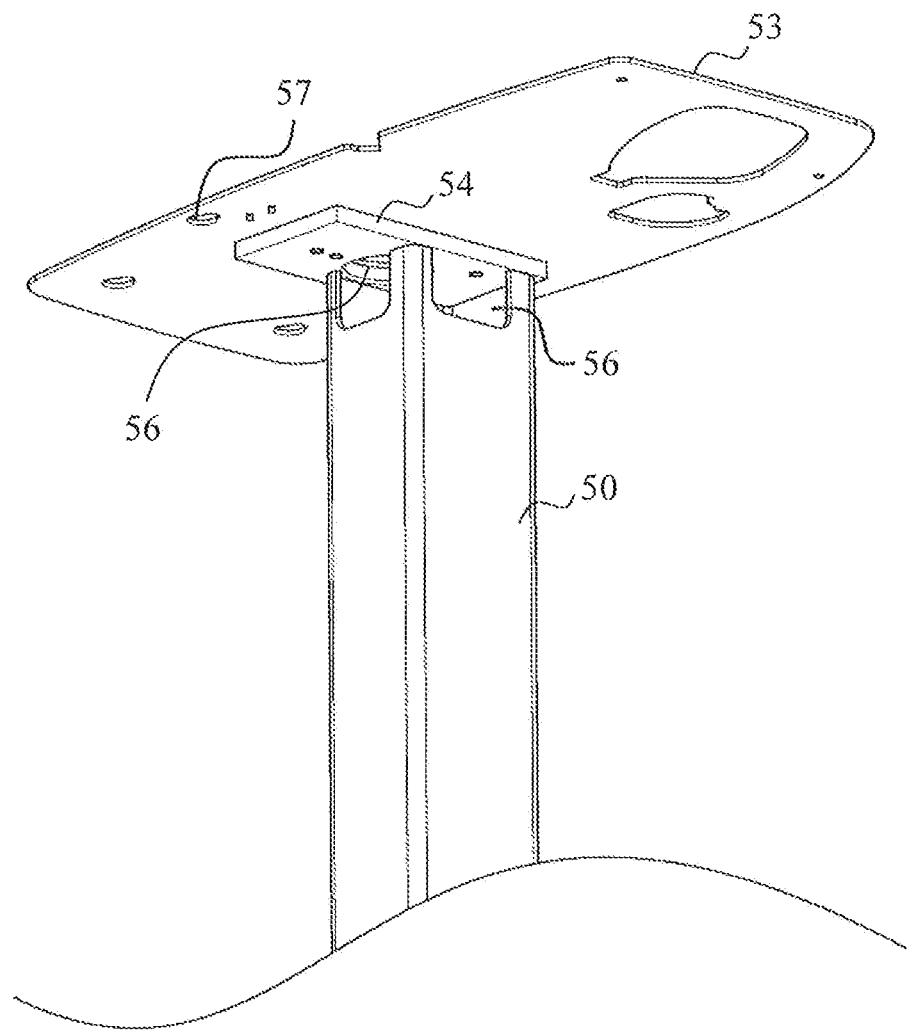
FIG. 6 shows solutions of the solution of FIG. 5 visible when viewed from obliquely below.

FIGS. 5 and 6 show an example of some preferred internal structures of the frame part 2 of the dental care unit. Compared to FIG. 1, the support arrangement 4 shown in FIG. 5 comprises only some of the corresponding structures.

Of the structures belonging to the frame part 2, below the support plate 53, FIG. 6 shows a support pillar 50 which carries the support plate 53, and a first connecting means 54 arranged into connection with the attaching arrangement of the support structure 4. FIG. 5 shows a second connecting means 54' which belongs to the attaching arrangement of the support structure 4 and is arranged above the support plate 53. The connecting means 54, 54' shown in FIGS. 5 and 6 have flanges on the upper and lower side of the support plate 53. Of these, according to one preferred embodiment of the invention, only the flange on the lower side is arranged to the structures of the frame part 2, when the support structure 4 comprising the vertical support part 41 is not attached to the dental care unit. In other words, in such solution the second connecting means 54' becomes part of the structure of the dental care unit only when a support structure comprising the vertical support part 41 is attached to the dental care unit.

The attaching structure for attaching the support structure 4 to the frame part 2 can be realized also in other ways than with a structure comprising two flanges as shown in FIGS. 5 and 6. It is for example possible to realize the attaching arrangement also such that engagement structures configured to match with the structures of the support structure 4 are already pre-arranged into connection with the frame part 2. In this case, engaging of the support structure 4 as part of the dental care unit can take place as kind of automatically when assembling the support structure 4.

The cover structures of the floor-mounted frame part of the dental care unit shown in FIG. 5 have been sectioned to illustrate a passage 56, which continues correspondingly in FIG. 6 inside the support pillar 50 and further through the support plate 53. The passage 56 is arranged in the structure for possible cabeling and tubes via which the instruments and/or devices supported by the support structure 4 and used via the dental care unit can be provided with the required physical variables and/or control signals, these being for example water, compressed air, and/or electricity.

In one preferred embodiment of the invention, a light arrangement 55, 55', which is arranged in connection with structures under the cover structure 22 of the dental care unit, is arranged for illuminating the seam locus 23, that is in practice one or more than one sealing elements 24 arranged in the seam locus 23.

In one preferred embodiment of the invention, the sealing element 24 is made in part or entirely of translucent material.

In one preferred embodiment of the invention, the sealing element 24 comprises at least one photoconductor which conducts light to the upper surface thereof, when illuminating the sealing element 24 by means of a light arrangement 55, 55' arranged for example in connection with structures under the cover structure 22.

The light arrangement 55, 55' can be any arrangement adapted compatible with the sealing element 24 but according to one example, the light arrangement 55, 55' comprises RGB LED components that, in as such known manner, can be controlled to produce light in different colours, at least two different colours, and/or light pulsed in different ways.

The arrangement for illuminating the seam locus 23 (that is one or more than one sealing elements 24) or for causing the seam locus 23 to emit light, can be realized also such that different parts of the seam locus 23 emit light in different ways. For example, in one embodiment of the invention, some areas in the seam locus 23 do not emit any of the light generated under the cover structure 22 or in the sealing element 24, whereas in another embodiment of the invention some areas in the seam locus 23 emit different colours.

The illumination of the seam locus 23, or more accurately the light emitted by it, can be utilized for many different purposes. It is for example possible to indicate by means of different illumination whether the power in the dental care unit is on or off, or to remind that the suction line of the dental care unit needs washing. Furthermore, it is possible to indicate for example the need to wash the instrument lines of the dental care unit, that such washing process is being performed or that such washing process is completed. Also a possible fault in the dental care unit may be informed.

Figure 7:
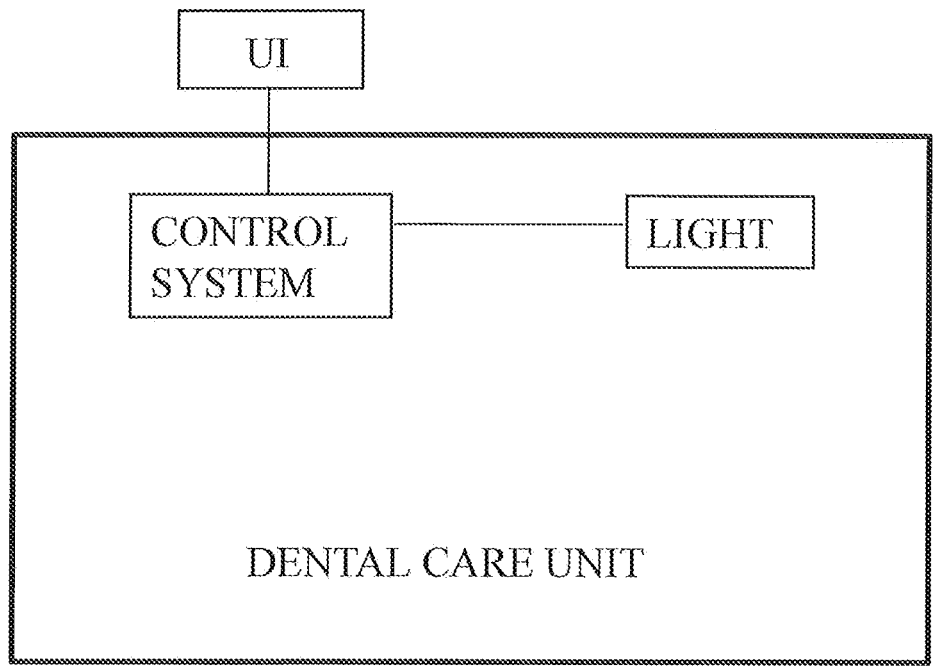
FIG. 7 shows as a schematic representation an arrangement for controlling lighting arranged in a dental care unit.

In one preferred embodiment of the invention the illumination of the seam locus is controlled by means of a control system of the dental care unit (FIG. 7). The control can be arranged to be implemented either directly from the control system or the illumination can be controlled via a user interface, for example a graphical user interface, of the dental care unit. The control can be partially based on identification of the person using the dental care unit, which recognition is transmitted to the control system.

The control system of the dental care unit can be arranged to output control signals for controlling at least one light emitting component 555 or light arrangement 55, 55' arranged in the dental care unit to produce light in at least two different ways, such as to produce light in at least two different colours, pulsed and unpulsed light, and/or to produce light which is pulsed in at least to different ways.

The control system can further be configured to associate at least one operating mode of the dental care unit with a certain colour and/or a certain pulsing of the light. The control system can in such case be provided with a means to recognize at least one such operating mode of the dental care unit and to control at least one light emitting component or light arrangement to emit that particular colour and/or light pulsed in that particular way.

The control system can also be provided with means to receive a user identification signal and based thereon to identify the person logged in as a user of the dental care unit, and the control system can be configured to comprise a user profile which is activated by said identification signal and which is provided with an option to choose the colour and/or pulsing of the light produced by at least one of the above-mentioned light emitting component (555) or light arrangement (55, 55'). Thus, the emitted light can be controlled from the control system according to the user profile.

Other ways for using the illumination is for example a personalization of the dental care unit, for example according to the colour of the patient chair used in connection with the dental care unit or other element used in the dental care unit.

Especially in environments such as training facilities, in which the same room or facility can have at least two or even dozens of dental care units, some solutions according to the preferred embodiments of the invention can make it possible to get at one glance an overview of the functional status of the dental care units in the particular facility. One preferred embodiment of the invention comprises indeed at least two dental care units according to the invention in one room or premises, in which the light emitting seam locus 23 extends across the substantially horizontal surface of the cover structure 22 all the way to the opposite vertical surfaces of the cover structure 22.

Figure 8:
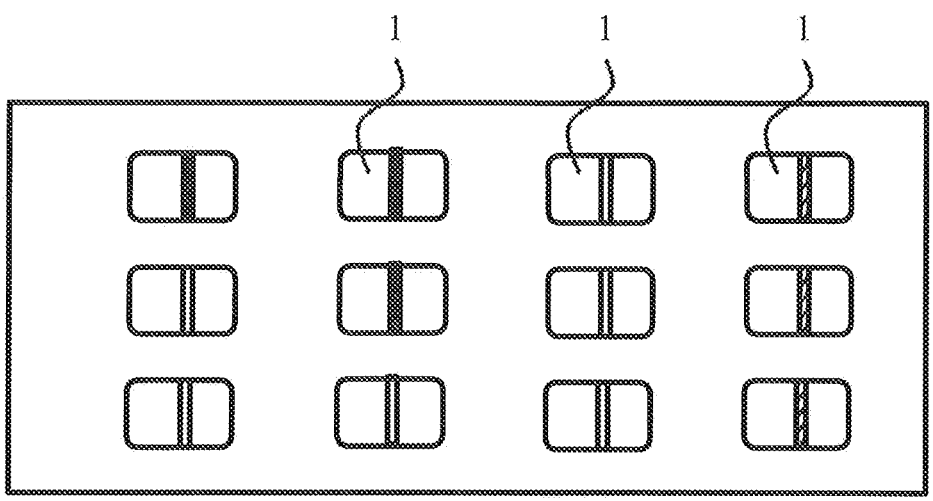
FIG. 8 shows a dental care room or a dental care premises which is provided with dental care units according to the invention.

It can also be considered to arrange a dedicated illumination for different users or user groups operating in the same dental care premises. FIG. 8 shows a situation in which the seam locuses of the cover structures of the dental care units arranged in a treatment room have three different illuminations that can indicate for example the first portion of the dental care units is not in use, the second is being used by users of a user group 1 and the third by users of a user group 2.

In one preferred embodiment of the invention, an arrangement is implemented in a dental care room or premises, in which at least two dental care units having an above-described cover structure are arranged to be visible simultaneously from at least one viewing direction, and in which dental care units the sealing element, which is arranged into the seam locus of the cover structure, i) comprises at least one light emitting component or ii) is made of a translucent material or comprises translucent material, wherein in connection with the structures of said frame part, under said cover structure, a light arrangement is provided for illuminating said sealing element. In such case, the cover structure preferably comprises at the seam locus a substantially horizontally extending portion, which at least at one outer periphery of the cover structure turns into a substantially vertical portion, and that said sealing element comprises at least one light emitting component or translucent material both in the horizontal and the vertical portions of the cover structure.

Furthermore, even for an individual dental care unit, the colour of the light can be arranged to be set via the control system of the dental care unit to correspond to for example the background colour of the user interface of the dental care unit as determined in the user profile of the user.

According to one preferred embodiment of the invention the control system of the dental care unit is provided with means to identify the person logged in as a user of the dental care unit, the control system is configured to comprise a user profile in which is arranged an option to choose the light and/or pulsing and an option to bring the control system to control the at least one light emitting component or light arrangement to emit that particular light and/or light pulsed in that particular way.

On the other hand, in connection with the treatment operations, for example a blinking light can be used to indicate a situation where the personnel has a reason to come to the dental care unit or when the time reserved for the treatment of a patient or the time determined for a certain procedure is coming to an end.

According to one example the control system of the dental care unit is arranged to control the light arrangement and/or at least one light emitting component arranged in the sealing element to produce light in different colours or light blinking in different ways based on for example the operating mode of the dental care unit or the status of the instrument or device used via the dental care unit.

The above-described and other functions of the light arrangement can thus be implemented by arranging the control system of the dental care unit to output control signals and by arranging the light arrangement and/or the at least light emitting component arranged in the sealing element to receive control signals from the control system of the dental care unit.

According to one preferred embodiment of the invention the illumination of the seam locus of the dental care unit provides a possibility to present information which partially corresponds to information which can be presented by for example a possible graphical user interface of the dental care unit, but in a way which can be easily noticed also from someplace other than right beside such user interface. This can be particularly useful in the embodiment of the invention concerning the dental care premises.

The invention claimed is:

1. A dental care unit, comprising:
   a frame part comprising a wall structure extending vertically and a cover structure positioning above the wall structure;
   an attaching arrangement comprising a first connecting means to enable attaching a vertically extending support part to the frame part, wherein the vertically extending support part is a part of a support arrangement, which is arranged to support at least one of the following components: one or more than one instrument used in dental care, an imaging device used in dental care, an operating light used in dental care;
   a control system of the dental care unit adapted to deliver to said at least one component operating power, fluid and/or control signals needed for operation of the dental care unit;
   characterized in that said cover structure comprises a first and a second cover part which join together in at least one seam locus, and at least one sealing element is arranged at said at least one seam locus; and
   wherein to at least one of said first and second cover part is arranged a cut-out or an opening adapted to receive the vertically extending support part, wherein the cut-out or opening adjoins to the area of said at least one seam locus or wherein the cut-out or opening adjoins to the seam locus.

2. The dental care unit according to claim 1, characterized in that said first connecting means is arranged compatible with a second connecting means, said first connecting means is arranged into the structures of the frame part of the dental care unit, and said second connecting means is configured for use together with the first connecting means to enable attaching said vertically extending support part to the frame part.

3. The dental care unit according to claim 1, characterized in that said cut-out or opening is arranged to be formed by notches delimiting to the seam locus arranged to both the first and the second cover parts.

4. The dental care unit according to claim 1, characterized in that said vertically extending support part is adapted to extend through said opening in the cover structure.

5. The dental care unit according to claim 1, characterized in that at least one of said at least first and second cover parts is arranged removably attached to the frame part.

6. The dental care unit according to claim 1, characterized in that a profile of a cross-section of said at least one sealing element comprises at least along a part of the length of the at least one sealing element at least one leakage groove, which is arranged to collect at a given seam locus the liquid possibly dripping from between the at least one sealing element and the cover structure.

7. The dental care unit according to claim 1, characterized in that the cover structure comprises at the at least one seam locus, at least in one area of said seam locus, a shape sloping downwards towards the outer periphery of the cover structure.

8. The dental care unit according to claim 1, characterized in that the outer periphery of the cover structure extends in the at least one seam locus horizontally beyond the vertically extending wall structure of said frame part and/or said cover structure comprises, at its outer periphery, in the at least one seam locus a portion extending substantially vertically downwards.

9. The dental care unit according to claim 1, characterized in that
   i) said at least one sealing element comprises at least one light emitting component, or
   ii) said at least one sealing element is made of a translucent material or comprises translucent material, and in connection with the structures of said frame part, under said cover structure, is arranged a light arrangement for illuminating said at least one sealing element.

10. The dental care unit according to claim 9, characterized in that the frame part comprises a support plate at a vertical distance below said cover structure, and said first connecting means is arranged in connection with said support plate, wherein in connection with said support plate, under said cover structure is arranged a light emitting component or components of the light arrangement.

11. The dental care unit according to claim 9, characterized in that said at least one light emitting component of the at least one sealing element or said light arrangement illuminating said at least one sealing element is arranged to emit light as pulsed manner and/or to emit at least two different colours.

12. The dental care unit according to claim 9, characterized in that said at least one light emitting component of the at least one sealing element or said light arrangement illuminating said at least one sealing element is arranged to receive control signals from the control system of the dental care unit.

13. The dental care unit according to claim 12 characterized in that said control signals are arranged to control said at least one light emitting component of the at least one sealing element or said light arrangement to produce light in different colours or blinking in different ways based on the operating mode of the dental care unit, or on the status of an instrument or device used via the dental care unit.

14. The control system of the dental care unit according to claim 1, characterized in that said at least one sealing element arranged in the seam locus of the cover structure
i) comprises at least one light emitting component, or
ii) is made of a translucent material or comprises translucent material, wherein in connection with the structures of said frame part, under said cover structure, is arranged a light arrangement for illuminating said at least one sealing element,
and the control system is arranged to output control signals for controlling said at least one light emitting component or said light arrangement to produce light in at least two different ways.

15. The control system according to claim 14, characterized in that the control system is arranged to control said at least one light emitting component or said light arrangement to produce light in at least two different colours, pulsed and unpulsed light, and/or to produce light pulsed in at least two different ways.

16. The control system according to claim 14, characterized in that the control system is configured to associate at least one operating mode of the dental care unit with a certain colour and/or with light pulsed in a certain way, the control system is provided with means to recognize said at least one such operating mode of the dental care unit, and the control system is arranged to control said at least one light emitting component or said light arrangement to emit that certain colour and/or light pulsed in that certain way.

17. The control system according to claim 14, characterized in that the control system is provided with a means to receive a user identification signal and based on it to identify the person logged in as a user of the dental care unit, the control system is configured to comprise a user profile which is activated by said identification signal and in which is arranged an option to choose the colour and/or pulsing of the light produced by said at least one light emitting component or by said light arrangement.

18. An arrangement in a dental care room or in a dental care premises, characterized in that the arrangement comprises two or more dental care units according to claim 1, of which at least two of said dental care units are arranged to be visible simultaneously from at least one viewing direction and in which dental care units said at least one sealing element arranged in at least one seam locus of the cover structure
i) comprises at least one light emitting component, or
ii) is made of a translucent material or comprises translucent material, wherein into connection with the structures of said frame part, under said cover structure, is arranged a light arrangement for illuminating said at least one sealing element.

19. The arrangement according to claim 18, characterized in that said cover structure comprises, at its at least one seam locus, a portion extending substantially horizontally which at least at one outer periphery of the cover structure turns into a substantially vertical portion, and that said at least one sealing element comprises at least one light emitting component or translucent material both on the horizontal and the vertical portions of the cover structure.

20. The dental care unit according to claim 1,
wherein said first connecting means is configured to enable detaching and replacing the vertically extending support part.

21. The dental care unit according to claim 1,
wherein said at least one of said first and second cover parts is configured to be opened to facilitate access to structure under the cover structure.

22. A dental care unit, comprising:
a frame part comprising a wall structure extending vertically and a cover structure positioning above the wall structure;
an attaching arrangement comprising a first connecting means to enable attaching a vertically extending support part to the frame part, wherein the vertically extending support part is a part of a support arrangement, which is arranged to support at least one of the following components: one or more than one instrument used in dental care, an imaging device used in dental care, an operating light used in dental care;
a control system of the dental care unit adapted to deliver to said at least one component operating power, fluid and/or control signals needed for operation of the dental care unit;
characterized in that said cover structure comprises a first and a second cover part which join together in at least one seam locus, and at least one sealing element is arranged at said at least one seam locus; and
wherein the frame part comprises a support plate at a vertical distance below said cover structure, and said first connecting means is arranged in connection with said support plate.

23. A dental care unit, comprising:
a frame part comprising a wall structure extending vertically and a cover structure positioning above the wall structure;
an attaching arrangement comprising a first connecting means to enable attaching a vertically extending support part to the frame part, wherein the vertically extending support part is a part of a support arrangement, which is arranged to support at least one of the following components: one or more than one instrument used in dental care, an imaging device used in dental care, an operating light used in dental care;

a control system of the dental care unit adapted to deliver to said at least one component operating power, fluid and/or control signals needed for operation of the dental care unit;

characterized in that said cover structure comprises a first and a second cover part which join together in at least one seam locus, and at least one sealing element is arranged at said at least one seam locus; and wherein said at least one sealing element extends in said at least one seam locus as far towards the outer periphery of the cover structure as the cover structure does.

\* \* \* \* \*